Aug. 3, 1954
H. R. SCHROYER
2,685,277
SNAP ACTION PNEUMATIC ACTUATOR
Filed Sept. 28, 1953
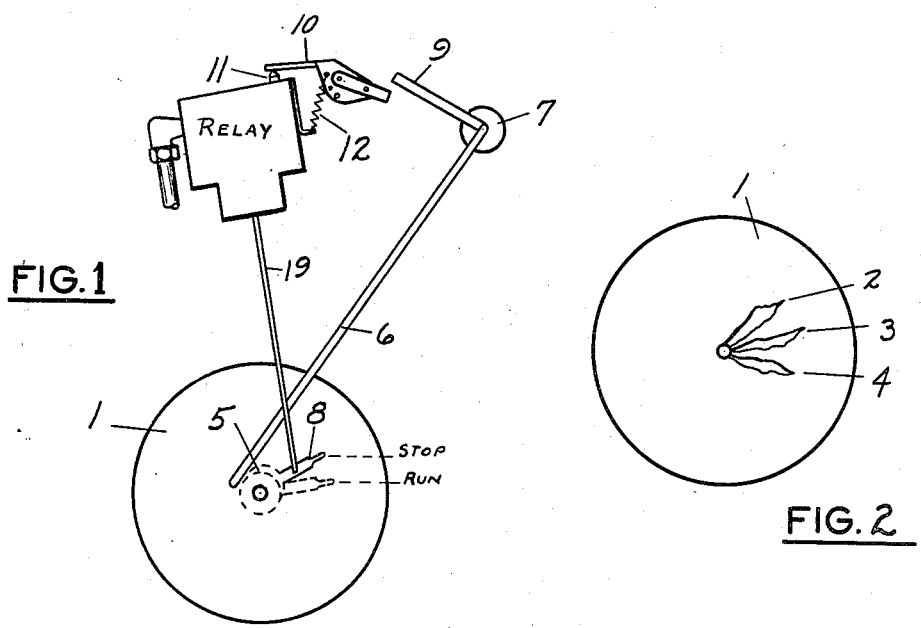
FIG.1
FIG.2
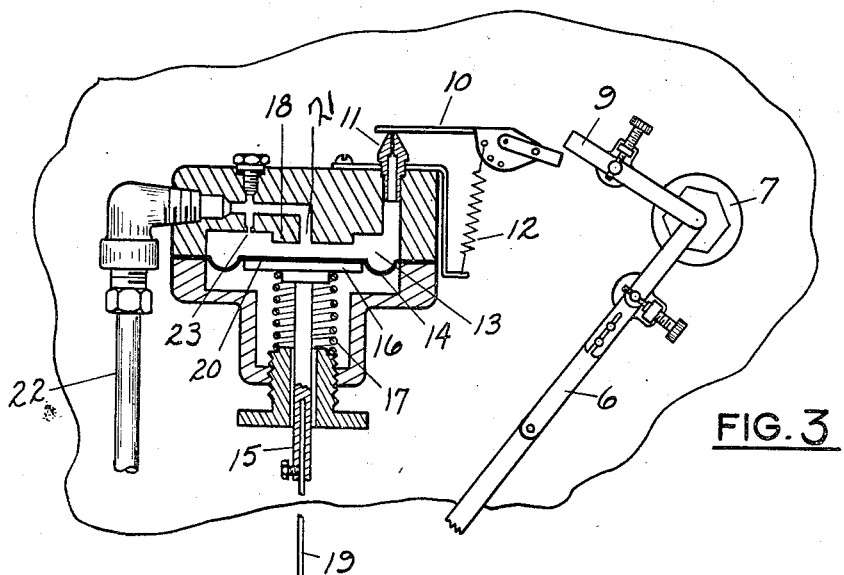
FIG.3
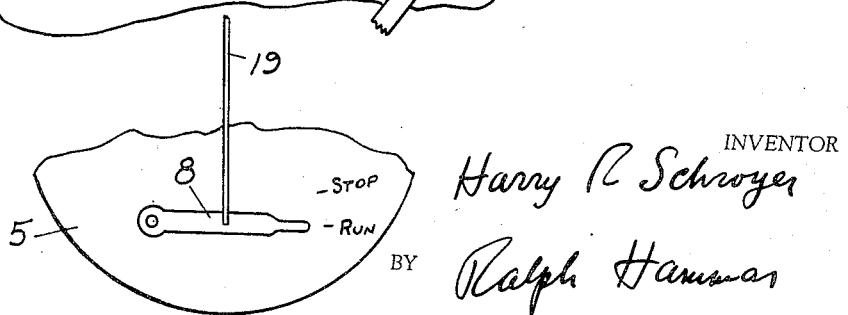
INVENTOR
Harry R Schroyer
BY Ralph Hausman
ATTORNEY Patented Aug. 3, 1954

2,685,277

UNITED STATES PATENT OFFICE 2,685,277

SNAP ACTION PNEUMATIC ACTUATOR

Harry R. Schroyer, Erie, Pa., assignor to American Meter Company, Incorporated, Erie, Pa., a corporation of Delaware Application September 28, 1953, Serial No. 382,657

2 Claims. (Cl. 121—48)

This invention is a pneumatic relay for producing a snap action motion without the use of an auxiliary amplifier. The snap action is obtained by a supplemental relatively large feed port which opens at the initial diaphragm movement and provides additional fluid pressure supply for completing the diaphragm movement with a snap action. One use of such relays is for starting instrument chart clocks where a snap action kick of the start lever provides the desirable impulse to the balance wheel insuring instantaneous starting of the clock.

In the accompanying drawing, Fig. 1 is a diagrammatic view showing the relay applied to an intermittent chart recorder; Fig. 2 is a view of the chart recording of the Fig. 1 instrument; and Fig. 3 is an enlarged sectional view of the snap action relay for starting and stopping the chart clock motor.

The invention is shown applied to an intermittent chart recorder adapted for use under conditions where there are substantial periods of time during which the instrument indication has a negligible or insignificant value. By stopping the chart motor when the instrument indication is negligible, a fast running chart motor can be used so that the area of the recorded values on the chart can be more easily integrated and at the same time charts will not be wasted during the time at which the instrument indication is not significant. In Fig. 2 there is shown a typical chart indication where the chart 1 has indications 2, 3, and 4 which appear on the chart as closely spaced together and yet may be separated by substantial time intervals. The intervals separating the indications 2, 3, and 4 may be many times as long as the periods during which instrument information is recorded.

The instrument for producing the Fig. 2 chart is diagrammatically shown in Fig. 1 where 5 indicates the chart clock motor and 6 indicates the pen arm actuated by an instrument 7. The chart clock motor has the usual start lever 8 which in the "stop" position engages the clock balance wheel and stops the clock and when quickly moved to the "run" position imparts the desirable impulse to the balance wheel for instantaneously starting the clock motor. The start lever for chart clock motors is common and need not be further illustrated for the purpose of this application.

The chart clock motor is controlled by a lever 9 which turns with the pen arm 6 and engages a flapper 10 and lifts the flapper clear of a nozzle 11 when the indication of the pen arm 6 drops to a negligible value. Whenever the pen arm 6 is above the negligible value so that significant information would be recorded on the chart 1, the lever 9 moves clear of the flapper 10 and the flapper 10 is sealed against the nozzle 11 by a spring 12. The nozzle 11 forms a bleed port from an annular chamber 13 on the upper side of a relay diaphragm 14. On the under side of the diaphragm 14 at the center is a plunger 15 having a head 16 providing a seat for a compression spring 17 which urges the diaphragm up against a depending projection 18 at the center of the chamber 13. The plunger 15 is connected by a link 19 to the clock start lever 8.

When the indication of the pen arm is at a zero or negligible value, the lever 9 engages the flapper 10 and lifts it off the nozzle 11. Under this condition, the bleeding of pneumatic pressure through the nozzle 11 reduces the pressure within the chamber 13 to a low enough value so that the spring 17 urges the diaphragm 14 upward and seals the central portion 20 of the diaphragm against the under side of the central projection 18. This seals off a relatively large feed port 21 fed directly from a pneumatic pressure supply line 22 and insures tight sealing of the central portion 20 of the diaphragm against the under side of the projection 18, because the chamber 13 is now fed from the supply line 22 through a restriction 23, which is much smaller than the nozzle 11. Under this condition, the link 19 attached to the plunger 15 moves the lever 8 to the stop position, stopping the chart clock motor. The chart clock motor remains stopped so long as the indication of the pen arm 6 is below a negligible value. As soon as the pen arm indication moves above the negligible value, the lever 9 moves clear of the flapper 10 and the flapper is sealed against the nozzle 11 by the spring 12. This shuts off the bleed from the annular chamber 13 and the pressure within this chamber accordingly builds up through the restriction 23. As soon as the pressure within the chamber 13 acting on the upper side of the diaphragm 14 reaches a value in excess of the force exerted by the spring 17, the central part of the diaphragm 14 moves away from the projection 18 uncovering the relatively large feed port 21 and making available the full pressure of the supply line 22. This full supply line pressure acting on the upper side of the diaphragm 14 quickly moves the plunger 15 downward with a snap action and accordingly moves the start lever 8 for the chart clock motor quickly from the stop to the run position thereby imparting the desirable impulse to the chart motor balance wheel insuring instantaneous starting of the chart clock motor. The chart motor start lever 8 remains in the run position so long as the pen arm indication is above a negligible value. When the pen arm indication again drops to a negligible value, the lever 9 engages the flapper 10 and lifts it clear of the nozzle 11 thereby bleeding the pressure within the annular chamber 13 to the atmosphere so that the pressure within the chamber drops to a low enough value so that the spring 17 moves the diaphragm 14 upward against the central projection 18 thereby sealing the large diameter feed port 21 and moving the lever 8 to the stop position. In this position, there is a bleed of air pressure through the restriction 23 and the nozzle 11 to the atmosphere, but since the restriction 23 is small, the loss of pneumatic pressure is not objectionable.

What is claimed as new is:

1. A pneumatic actuator comprising a diaphragm, an annular chamber on one side of the diaphragm, a projection at the center of the chamber, a restricted pressure supply way leading to the chamber, a larger pressure supply way leading to the chamber through said projection, a spring urging the center of the diaphragm into sealing engagement with the larger way, a bleed nozzle of size larger than said restricted way leading from the chamber, a control for the nozzle bleed, said nozzle when open bleeding the pressure in the chamber to a value causing movement of the diaphragm into sealing engagement with the larger pressure supply way and said nozzle when closed causing a build-up in pressure in the chamber moving the diaphragm out of sealing engagement with the larger way after which the further movement of the diaphragm is effected with a snap action due to the additional pressure supply from the larger way, and an actuator plunger connected to and moved with the diaphragm.

2. A pneumatic actuator comprising a diaphragm, two pressure supply ways for the diaphragm, one being relatively restricted compared to the other and said diaphragm being movable into and out of sealing engagement with the larger of the two supply ways, a bleed way for the diaphragm larger than said restricted way, spring means urging the diaphragm into sealing engagement with the larger of said two supply ways, said bleed way when open reducing the pressure on the diaphragm to less than the force exerted by the spring means whereby the larger supply way is sealed and said bleed way when closed increasing the pressure on the diaphragm to more than the force exerted by the spring whereby the larger supply way is opened and the pressure acting on the diaphragm is supplemented by the pressure from the larger way causing a snap action movement of the diaphragm away from sealing engagement with the larger way, a control for the bleed way, and an actuator connected to and movable with the diaphragm.

No references cited.